(12) United States Patent
El Baraka et al.

(10) Patent No.: US 8,362,664 B2
(45) Date of Patent: Jan. 29, 2013

(54) ROTATING ELECTRICAL MACHINE

(75) Inventors: Khadija El Baraka, Bussy St. Georges (FR); Sveltislav Jugovic, Joue-les-Tours (FR); Michel Fakes, Seclin (FR); Ryadh Ben Omrane, Chevilly-Larue (FR); Julien Masfaraud, Paris (FR); Denis Even, Paris (FR); Denis Bodin, Saint Martin Boulogne (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 419 days.

(21) Appl. No.: 12/613,145

(22) Filed: Nov. 5, 2009

(65) Prior Publication Data

US 2010/0141065 A1 Jun. 10, 2010

(30) Foreign Application Priority Data

Nov. 5, 2008 (FR) .................................. 08 57508
Nov. 5, 2008 (FR) .................................. 08 57511

(51) Int. Cl.
*H02K 3/38* (2006.01)

(52) U.S. Cl. .......................................................... 310/71

(58) Field of Classification Search .................... 310/71, 310/260, 270
See application file for complete search history.

(56) References Cited

U.S. PATENT DOCUMENTS

| | | | | |
|---|---|---|---|---|
| 4,656,410 A * | 4/1987 | Shibata | | 318/718 |
| 5,508,571 A | 4/1996 | Shafer | | |
| 6,617,723 B1 * | 9/2003 | Shichijyo | | 310/71 |
| 6,624,544 B2 * | 9/2003 | Higashino et al. | | 310/201 |
| 7,075,206 B1 * | 7/2006 | Chen | | 310/179 |
| 2002/0067094 A1 | 6/2002 | Okazaki et al. | | |
| 2007/0278875 A1 | 12/2007 | Haga et al. | | |
| 2008/0122301 A1 * | 5/2008 | Okada et al. | | 310/43 |
| 2009/0039720 A1 * | 2/2009 | Tsukashima et al. | | 310/71 |

FOREIGN PATENT DOCUMENTS

| | | |
|---|---|---|
| EP | 0 881 752 A1 | 12/1998 |
| EP | 1 184 960 A1 | 3/2002 |
| EP | 1 876 685 A2 | 1/2008 |
| FR | 2 780 828 A1 | 1/2000 |
| FR | 2 904 489 A1 | 2/2008 |
| WO | WO 2005/064769 A1 | 7/2005 |
| WO | WO 2007/111287 A1 | 10/2007 |
| WO | WO 2008/027535 A2 | 3/2008 |

* cited by examiner

*Primary Examiner* — Tran Nguyen
(74) *Attorney, Agent, or Firm* — Berenato & White, LLC

(57) ABSTRACT

The disclosure relates to a rotating electrical machine (1), in particular an alternator or an alternator-starter for a motor vehicle. At least one bearing mount (48) is provided with at least one opening (49) opening onto the exterior of the bearing mount. A stator (16) comprising an electric coil (18) is provided. This coil includes a plurality of electric conductors, at least one of which includes an end forming an electrical neutral point of the coil. The machine further includes an electrical insulation member (70) configured to prevent any contact between the bearing mount (48) and said neutral point-forming conductor end. The insulation member extends at least partially through the opening of the bearing mount and is at least partially outside the bearing mount. The electrical insulation member being furthermore configured to rest at least partially on an outer surface (71) of the bearing mount.

13 Claims, 8 Drawing Sheets

ROTATING ELECTRICAL MACHINE

FIELD OF THE INVENTION

The invention relates in particular to a rotating electrical machine, especially to an alternator or an alternator-starter for a motor vehicle.

BACKGROUND OF THE INVENTION

An alternator comprising a stator provided with an electric coil forming several phases is known from U.S. Pat. No. 7,170,210. Phase inputs are formed on conducting bars.

On certain electrical machines, it can occur that neutral points or phase outputs or inputs of the stator coil are situated very close to a bearing mount of the machine. This can increase the risk of accidental electrical contact between a conductor of the coil and the bearing mount.

An alternator comprising a housing, a stator coil and an electrically insulating piece interposed between the housing and the coil is known from patent application FR 2 780 828.

SUMMARY OF THE INVENTION

The invention seeks in particular to propose a new type of protection for conductors of the stator coil from a bearing mount of the machine.

The subject-matter of the invention is thus a rotating electrical machine, in particular an alternator or an alternator-starter for a motor vehicle, comprising:
- at least one bearing mount provided with at least one opening opening onto the exterior of the bearing mount,
- a stator comprising an electric coil, this coil comprising a plurality of electric conductors and at least one of these conductors comprising an end forming an electrical neutral point of the coil,
- an electrical insulation member configured to prevent any contact between the bearing mount and said neutral point-forming conductor end, this insulation member extending at least partially through the opening of the bearing mount and being at least partially outside the bearing mount.

According to one aspect of the invention, the electrical insulation member is advantageously configured to rest at least partially on an outer surface of the bearing mount.

In one exemplary embodiment of the invention, the electrical insulation member has a substantially annular shape.

The electrical insulation member can have a closed or, in a variant, interrupted annular shape.

Preferably, the insulation member comprises at least one tongue extending at least partially through the opening of the bearing mount and configured to prevent any contact between the bearing mount and said neutral point-forming conductor end.

Preferably, the insulation member comprises a plurality of tongues advantageously distributed in a substantially uniform manner along an arc of a circle on the insulation member.

In one exemplary embodiment of the invention, the insulation member comprises as many insulation tongues as there are neutral points of the coil, this number being for example equal to seven.

If appropriate, the insulation tongue comprises a substantially semicylindrical base connected to a planar face of the insulation member, preferably in an inclined manner relative to this planar face so as to form an advantageously non-zero angle.

The insulation member can comprise at least one notch configured to receive a phase output-forming conductor end, this notch being in particular open on an outer periphery of the insulation member.

The insulation member is for example made of plastics material.

Advantageously, the insulation member is configured to plug at least partially, in particular with the aid of a radially protruding portion, at least one opening, in particular a plurality of openings, of the bearing mount.

The insulation member can, if appropriate, plug in its entirety at least one opening of the bearing mount.

This may help to limit axial exchanges of air, in particular by recirculation, in the machine in the region of an electronic unit fixed to the bearing mount, in order to reduce the temperature of the electronic unit and thus to increase the performance levels of the machine.

In one exemplary embodiment of the invention, the insulation member comprises at least one engagement tab configured to allow this insulation member to be fixed to the bearing mount.

If appropriate, the machine can comprise at least one electronic unit equipped with a heat dissipator provided with fins, and the insulation member comprises at least one groove allowing a fin of the heat dissipator to be engaged at least partially therein.

This may allow the product to be made mechanically compatible with various types of means available for fixing to bearing mounts.

For example, the groove is formed between two elastically deformable tabs, these tabs extending in particular over an outer face of the insulation member.

In one exemplary embodiment of the invention, the insulation member comprises a, in particular substantially cylindrical, rim extending substantially in the extension of a cylindrical wall of a hood of the machine.

Another subject-matter of the invention is a rotating electrical machine, in particular an alternator or an alternator-starter, comprising:
- a stator comprising an electric coil, this coil comprising a plurality of electric conductors and at least one of these conductors comprising an end forming an electrical neutral point of the coil,
- an electrical insulation member configured to cap the neutral point-forming conductor end, this member being in particular disposed in an inner space defined between bearing mounts of the machine.

The insulation member can comprise at least one cap, in particular formed by a recess in an insulating strip, for example substantially in the shape of an arc of a circle, to cap the neutral point-forming conductor end.

This recess can for example be bowl-shaped.

Advantageously, the insulation member comprises a plurality of caps distributed over the insulating strip.

In one exemplary embodiment of the invention, the neutral point-forming conductor end is welded to an electrically conducting bar, and the electrical insulation member comes to cap the neutral point-forming conductor end and a portion at least of the conducting bar.

For example, the coil of the stator comprises a plurality of pin-type conductors.

This stator coil may be of the star-shaped type.

In one exemplary embodiment of the invention, the stator coil is of the heptaphase type, with in particular seven neutral points.

Another subject-matter of the invention is an electrical insulation member of a machine as defined hereinbefore.

The invention also relates to a rotating electrical machine, in particular an alternator or an alternator-starter, comprising:
- a stator comprising an electric coil, this coil comprising a plurality of electric conductors and at least one of these conductors comprising an end forming an electrical neutral point of the coil,
- an insulating cap configured to cap the neutral point-forming conductor end, this cap being configured to be able to be positioned from the outside of bearing mounts of the machine, through an opening of one of these bearing mounts.

In one exemplary embodiment of the invention, the conductor ends forming neutral points are each capped by an individual cap.

The invention also relates to a method for manufacturing a rotating electrical machine as defined hereinbefore, including the following step:
- capping the neutral point-forming conductor end with an electrically insulating cap positioned from the outside of bearing mounts of the machine, through an opening of one of these bearing mounts.

A subject-matter of the invention is, according to another of its aspects, a rotating electrical machine, in particular an alternator or an alternator-starter for a motor vehicle, comprising:
- a stator comprising an electric coil, this coil comprising a plurality of electric conductors and at least two of these conductors each comprising an end forming for example an electrical neutral point of the coil,
- an electrical connection member configured to allow two points, in particular two neutral points, of the coil of the stator to be electrically connected, this electrical connection member comprising at least one electrically conductive element partially embedded, in particular by over-moulding, in an electrically insulating material.

Owing to the invention, the electrical connection between the two points of the coil may be relatively robust.

In one exemplary embodiment of the invention, the connection member comprises a crown made of the electrically insulating material.

If appropriate, the electrical connection member comprises a plurality of conductive elements, each being substantially U-shaped, at least two of these neighbouring conductive elements forming a space for inserting a conductor end forming an electrical neutral point of the coil.

This may allow a welded joint of the conductive elements to be made highly accessible.

Advantageously, the conductor end forming an electrical neutral point of the coil is welded, in particular by resistance or electric arc braze welding or by soft or laser brazing, to the adjacent conductive elements of the electrical connection member.

Preferably, the conductive elements of the electrical connection member each comprise at least one chamfer facing the stator coil configured to facilitate the insertion of a conductor end forming an electrical neutral point of the coil.

This may allow the formation of a, for example conical, guide for inserting the conductor.

In one exemplary embodiment of the invention, the electrical connection member comprises at least one slot, opening in particular onto an inner periphery of this connection member, this slot being configured to receive at least partially the conductor end forming an electrical neutral point of the coil.

If desired, the connection member has a substantially circular inner periphery, and said slot forms with a diameter of the connection member a non-zero angle. This inclination of the slot may be advantageous in particular for the passage of a tool for welding the conductor of the coil.

In a variant, the connection member has a substantially circular inner periphery, and said slot extends parallel to a diameter of the connection member.

In one exemplary embodiment of the invention, the electrical connection member comprises at least one orifice, in particular formed in an electrically insulating crown, configured to allow the passage of an electric conductor portion of the stator coil, this conductor portion forming advantageously a phase input or output of the stator coil. This may be advantageous for rigidifying the foot of the conductor portion passing through the orifice.

If desired, the conductive elements of the connection member are made of copper.

Advantageously, the conductive elements of the connection member are embedded in the plastics material over the majority of their length.

The electrical connection member may for example be placed on a tip of a lead-out of the stator coil.

The invention may thus allow satisfactory heat insulation.

Preferably, the connection member plugs at least partially an aeration opening of a bearing mount of the machine, in order in particular to limit axial exchanges of air between the interior of the bearing mounts and the rear of an electronic unit of the machine.

The invention also relates to an electrical connection member, in particular for a machine as defined hereinbefore, this electrical connection member being advantageously configured to allow two neutral points of a stator coil to be electrically connected, this electrical connection member comprising at least one electrically conductive element partially embedded, in particular by over-moulding, in an electrically insulating material.

Another subject-matter of the invention is a rotating electrical machine, in particular an alternator or an alternator-starter for a motor vehicle, comprising:
- a stator comprising an electric coil, this coil comprising a plurality of electric conductors and at least two of these conductors each comprising an end forming an electrical neutral point of the coil,
- an electrical connection member configured to allow two neutral points of the coil of the stator to be electrically connected, this electrical connection member comprising at least one electrically conductive strip, this conductive strip being bare, by lacking electrically insulating coating or being enameled and locally stripped.

Advantageously, the conductive strip comprises at least one U-shaped portion allowing contacting with an end forming an electrical neutral point of the coil.

BRIEF DESCRIPTION OF THE DRAWINGS

The invention may be better understood on reading the following detailed description of non-limiting exemplary embodiments of the invention, and on examining the appended drawings, in which.

Figure 1:
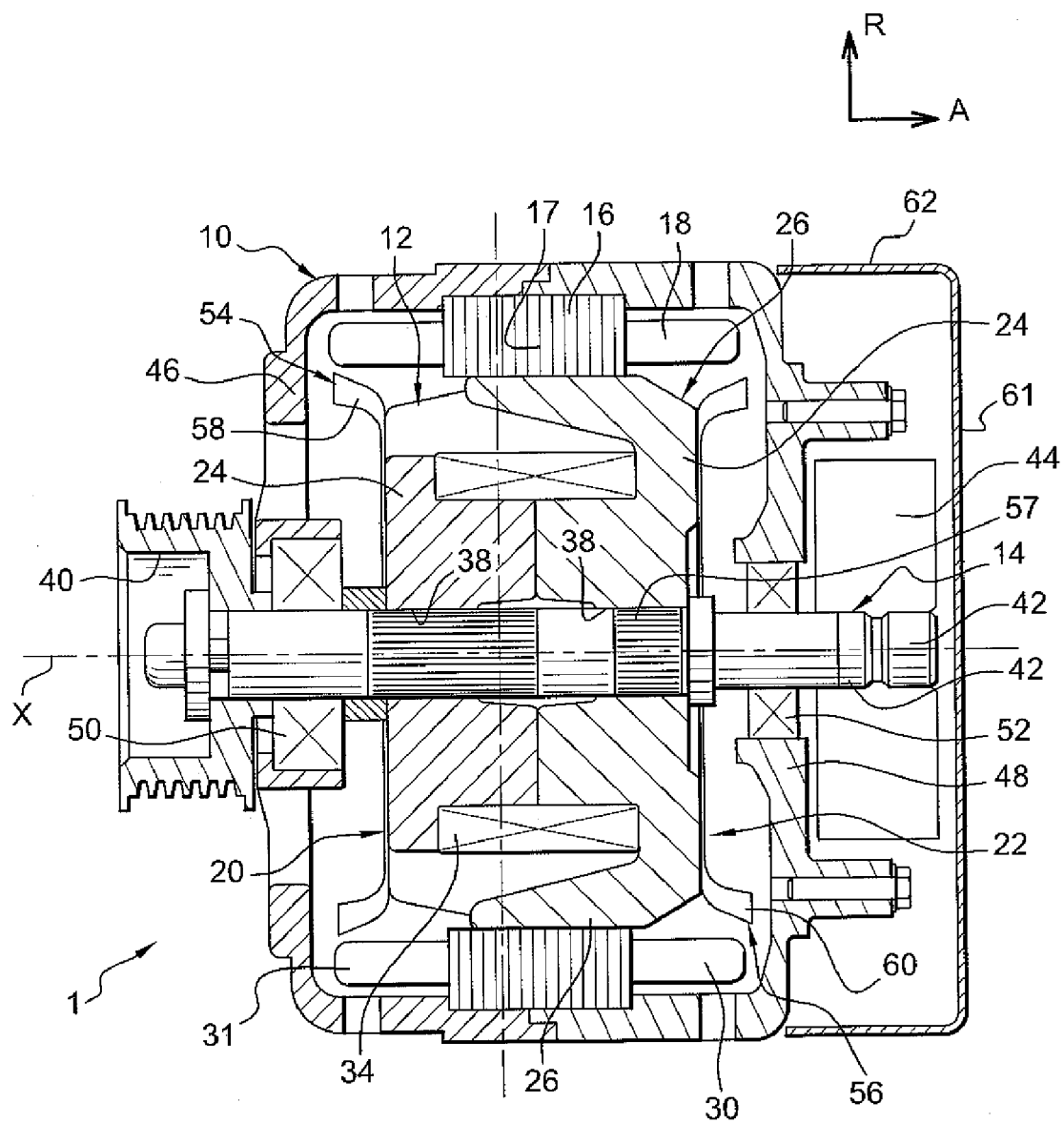
FIG. 1 shows, schematically and partially, in longitudinal section, an alternator according to an exemplary embodiment of the invention.

In the remainder of the description, the arrows "A" and "R" from FIG. 1 indicate the axial direction and the radial direction respectively.

DETAILED DESCRIPTION

FIG. 1 shows a polyphase rotating electrical machine 1 forming, in the present exemplary embodiment of the invention, an alternator for a motor vehicle.

Of course, the electrical machine 1 may, if desired, be reversible and form an alternator-starter capable of operating in electric motor mode to start the combustion engine of the vehicle and in alternator mode to produce electrical energy.

This machine 1 comprises a housing 10 and, inside the housing, a rotor 12 which is integral in rotation with a rotating shaft 14 having an axis X, called the rotor shaft, and a stator 16 which surrounds the rotor 12.

The stator 16 comprises a body 17 formed by a pack of metal sheets provided with notches for mounting a stator coil 18 forming lead-outs 30 and 31 either side of the stator body 17.

The rotor 12 comprises two polar wheels 20 and 22, each provided with a transverse flange 24, connected to the periphery of which are a plurality of claws 26 extending substantially in the axial direction A.

The claws 26 of one polar wheel form with the claws 26 of the other polar wheel interpolar spaces configured each to receive a magnet structure (not shown).

An excitation coil 34 is positioned between the flanges 24 of the polar wheels 20 and 22.

Each polar wheel 20; 22 comprises a bore forming an inner conduit 38 for receiving the shaft 14.

The polar wheels 20 and 22 are made for example of steel.

The shaft 14 carries at its leading end a pulley 40 pertaining to a device for transmitting movement via at least one belt (not shown) between the alternator 1 and the combustion engine of the motor vehicle, and at its trailing end collector rings 42 connected by wire connections (not shown) to the excitation coil 34 of the rotor 12.

Brushes of a brush holder 44 (shown in a highly schematic manner) are disposed so as to rub against the collector rings 42, in order to supply electric current to the coil 34.

When the shaft 14 is rotating and the excitation coil 34 activated by an electrical power supply, the inductor rotor 12 creates an induced alternating current in the stator 16.

The housing 10 comprises, in the example in question, two parts, namely a front bearing mount 46 and a rear bearing mount 48 carrying the brush holder 44.

The bearing mounts 46 and 48 each carry a ball bearing 50 and 52 respectively for mounting the shaft 14 in rotation.

Figure 2:
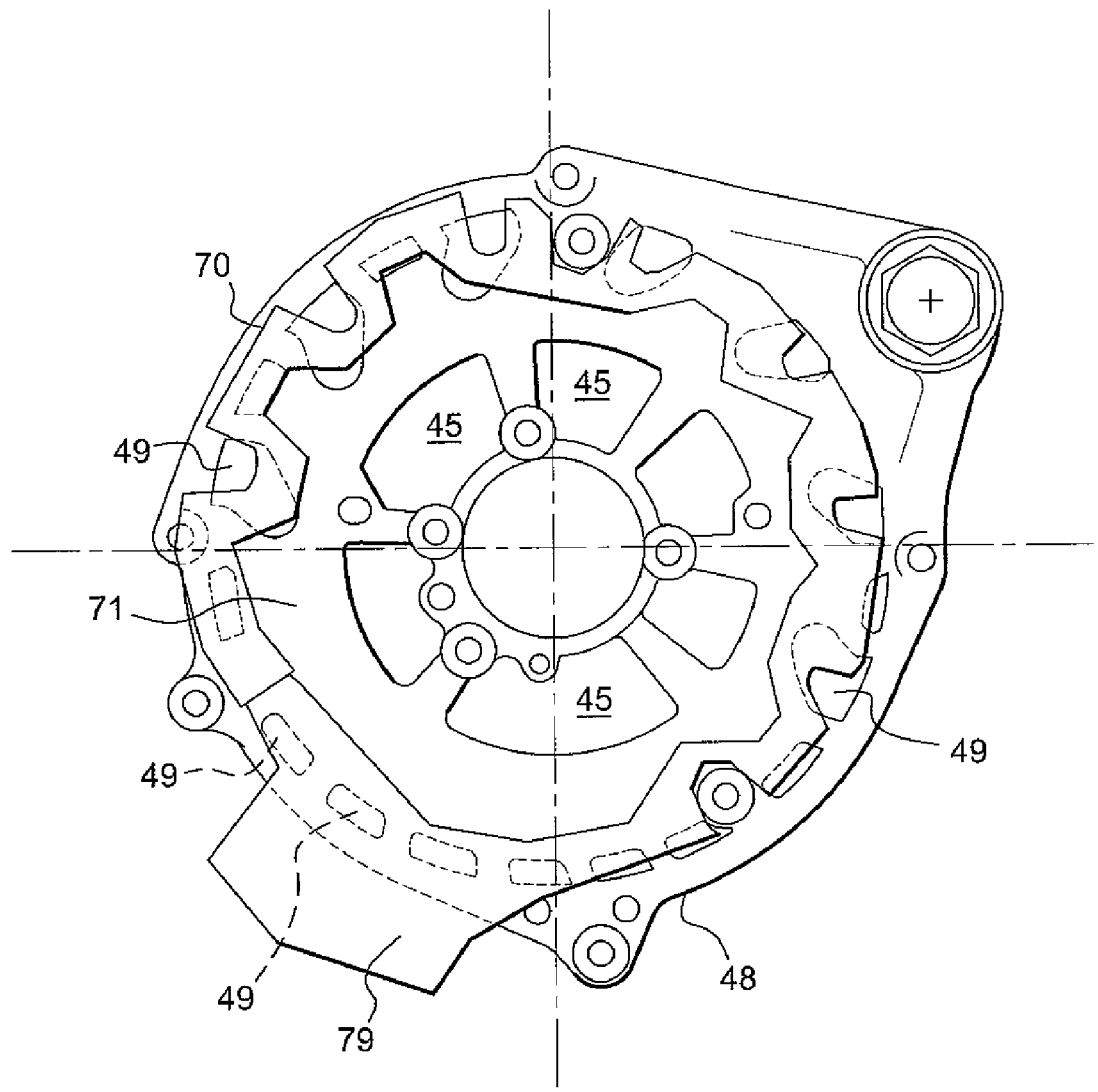
FIG. 2 illustrates, schematically and partially, the machine from FIG. 1, with an electrical insulation member according to an exemplary embodiment of the invention.

As may be seen from FIG. 2 in particular, the bearing mounts 46 and 48 are provided with radially inner 45 and radially outer 49 openings for in particular allowing the passage of cooling air within the machine.

The rear bearing mount 48 is capped by a protective hood 61. The protective hood comprises a lateral cylindrical skirt 62 extending along the axis X.

The rotor 12 carries, in the example described, at least at one of its axial ends a fan intended to circulate air. A first ventilation element 54 is for example provided on the front transverse face of the rotor 12 and a second ventilation element 56 is provided on the rear face of the rotor 12. Each ventilation element 54 and 56 is provided with a plurality of blades 58 and 60.

In the example described, the coil 18 of the stator 16 is of the heptaphase type, that is to say it has seven phases, with seven neutral points.

In a variant, the coil 18 may have a different number of phases, for example three, five or six.

The coil 18 is formed, in the example described, by a plurality of pin-type conductors.

In a variant, the coil 18 may be formed by a plurality of electrically conductive wires.

The neutral points of the coil 18 are formed on conductor ends of the coil 18.

According to a first aspect of the invention, as illustrated in FIGS. 2 to 5, an electrical insulation member 70 is provided to prevent any electrical contact between the rear bearing mount 48 and the conductor ends forming neutral points.

This insulation member 70 extends partially through radially outer openings 49 of the rear bearing mount 48.

This electrical insulation member 70 is positioned so as to rest on an outer surface 71 of the rear bearing mount 48.

Figure 3:
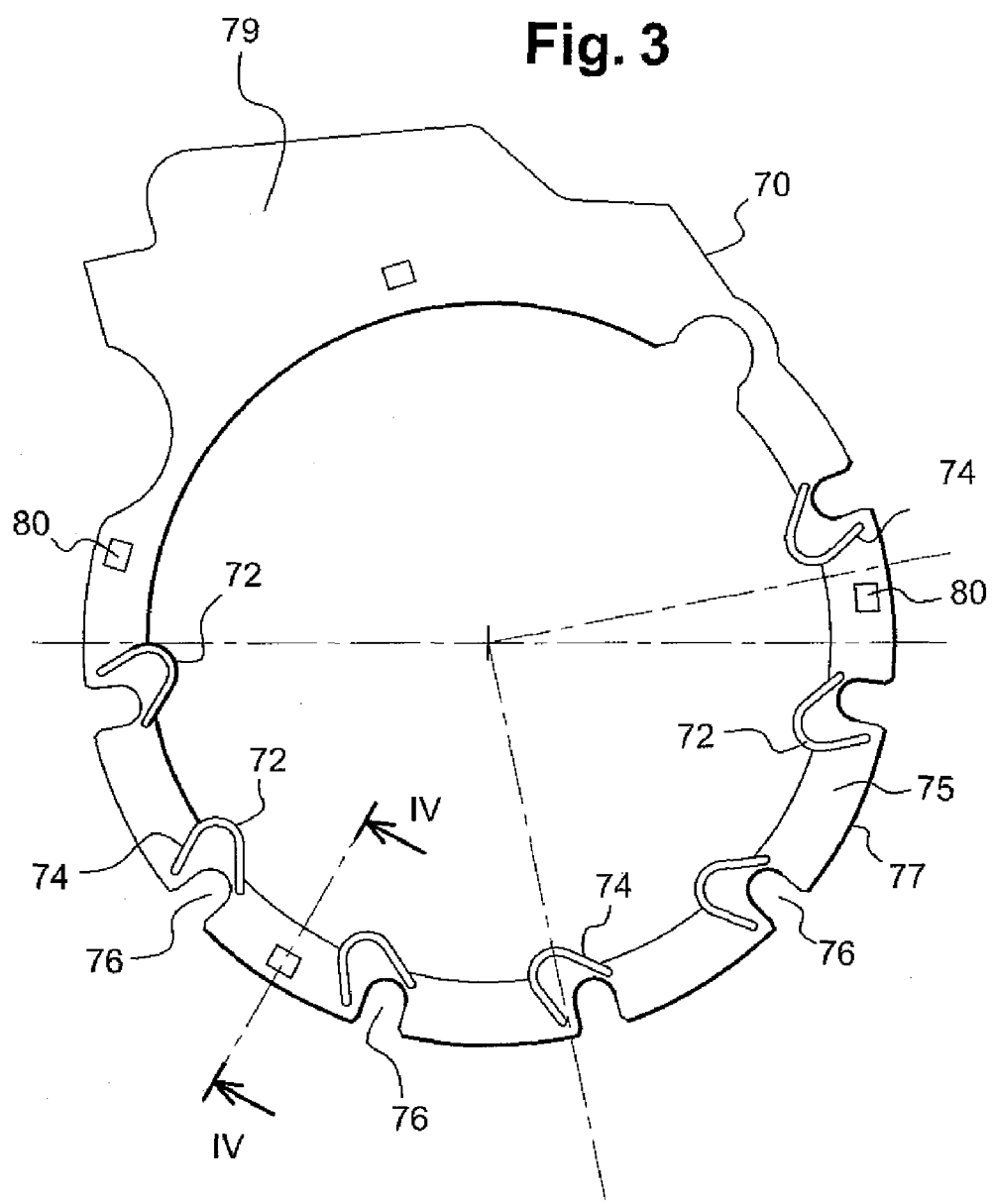
FIG. 3 shows, schematically and partially, in an isolated manner, the insulation member from FIG. 2.

As may be seen from FIGS. 2 and 3 in particular, the electrical insulation member 70 has a substantially closed annular shape.

In the example described (see FIG. 3 in particular), the insulation member 70 comprises a plurality of tongues 72 extending through openings 49 of the bearing mount 48 and configured to prevent any contact between the bearing mount 48 and the conductor ends forming neutral points.

These tongues 72 are distributed in a substantially uniform manner along an arc of a circle on the insulation member 70.

The insulation member 70 comprises as many insulation tongues 72 as there are neutral points of the coil, this number being equal to seven in the example described.

Each insulation tongue 72 comprises a substantially semi-cylindrical base 74 connected to a planar face 75 of the insulation member 70, in an inclined manner relative to this planar face 75 so as to form a non-zero angle.

This enveloping shape of each tongue 72 allows insulation over about 180° around the neutral point-forming conductor.

The insulation member 70 comprises a plurality of notches 76 configured each to receive a phase output-forming conductor end, each notch 76 being open on an outer periphery 77 of the insulation member 70.

The insulation member 70 is for example made of plastics material, by injection moulding.

Furthermore, the insulation member 70 is configured to plug, with the aid of a radially protruding portion 79, openings 49 of the rear bearing mount 48, as may be seen in FIG. 2.

Figure 4:
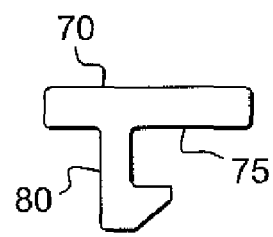
FIG. 4 shows, schematically and partially, in section along IV-IV, the insulation member from FIG. 3.

The insulation member 70 comprises a plurality of engagement tabs 80 configured to allow fixing by engagement of this insulation member 70 to the bearing mount 48, as illustrated in FIG. 4.

Figure 5:
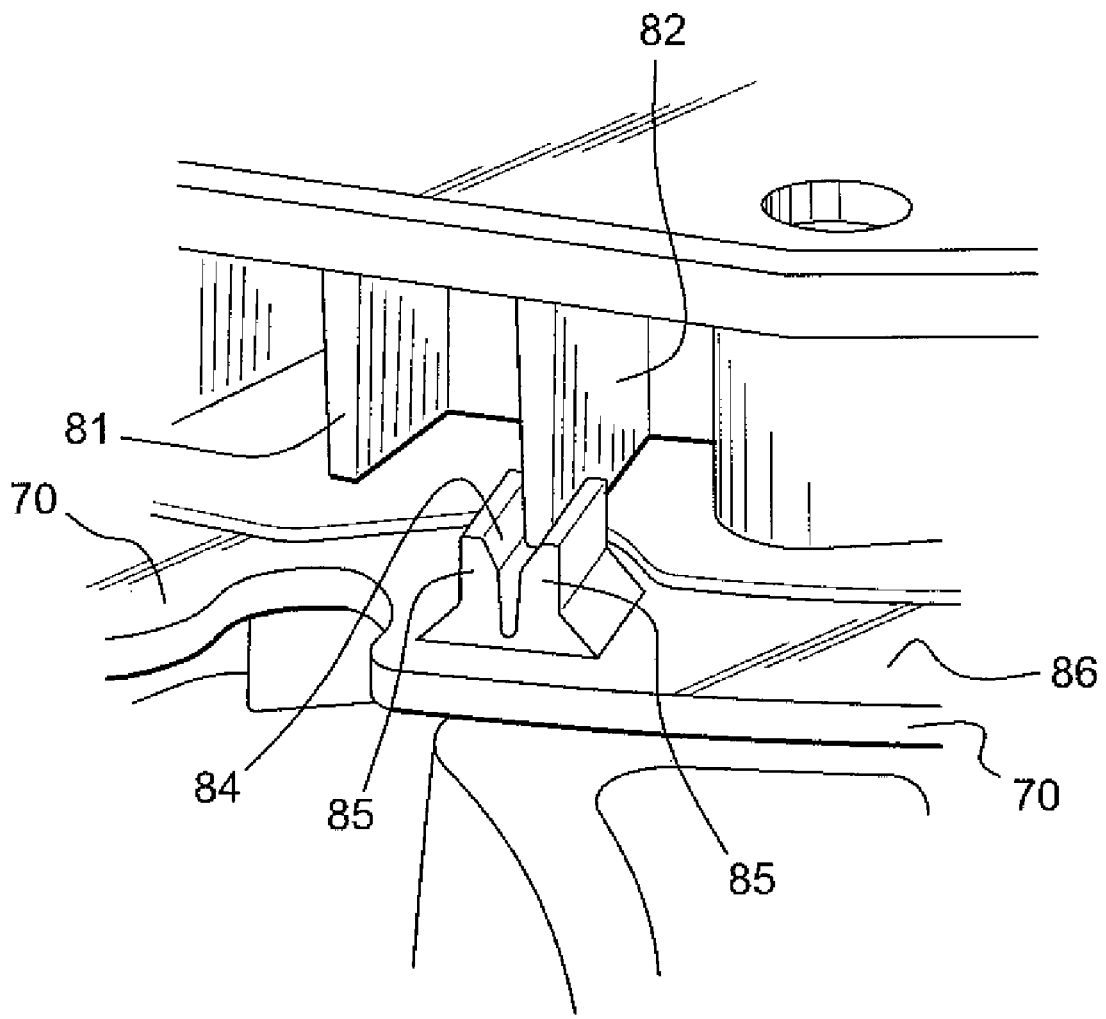
FIG. 5 shows, schematically and partially, in perspective, a detail of the insulation member from FIG. 2, cooperating with a fin of a heat dissipator.

When the machine 1 comprises an electronic unit equipped with a heat dissipator 81 provided with fins 82 as illustrated in FIG. 5, the insulation member 70 can comprise a groove 84 allowing a fin 82 of the heat dissipator 81 to be partially engaged therein.

The groove 84 is formed between two elastically deformable tabs 85, these tabs 85 extending over an outer face 86 of the insulation member 70.

In one exemplary embodiment (not illustrated), the insulation member 70 can comprise a cylindrical rim extending substantially in the extension of the skirt 62 of the hood 61 of the machine 1.

In one exemplary embodiment of the invention, the insulation member 70 can comprise protrusions extending axially through one or more aeration openings 49, although these openings do not surround the neutral point-forming conductor ends. These protrusions may be of substantially the same shape as these aeration openings 49 and their thickness may be selected so as to be substantially equal to the thickness of the plate of the bearing mount. These protrusions preferably do not exceed the outer diameter of the insulation member 70.

FIGS. 6 to 11 show another exemplary embodiment of the invention.

In this example, an electrical connection member 90 is provided to allow several neutral points of the coil 18 of the stator 16 to be electrically connected.

This member 90 also allows insulation of the coil of the stator, as well as blocking of openings of the bearing mount to limit axial air flows.

Figure 8:
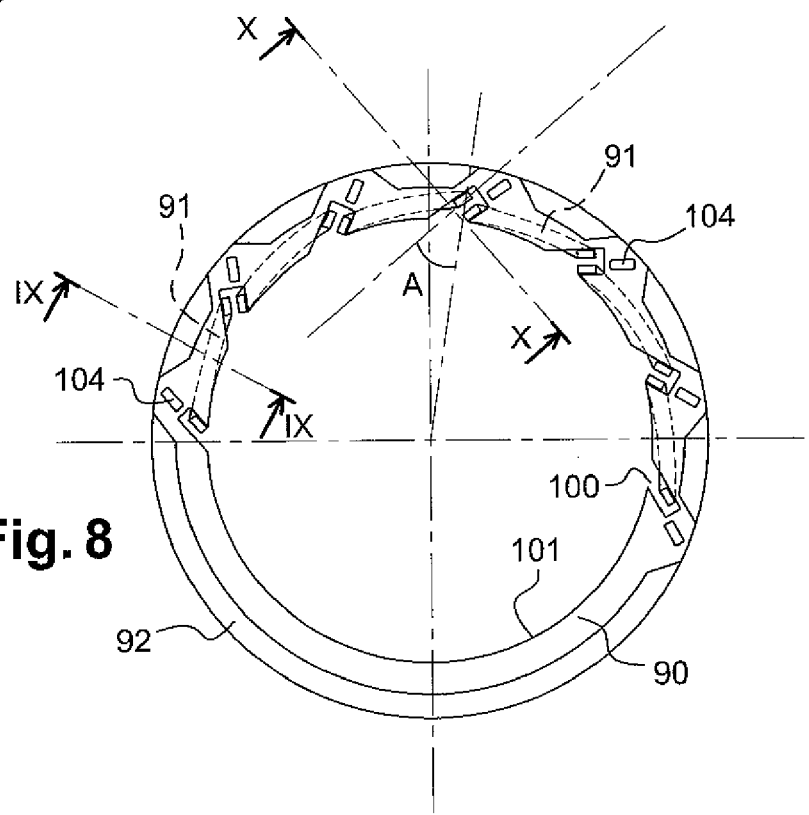
Figure 9:
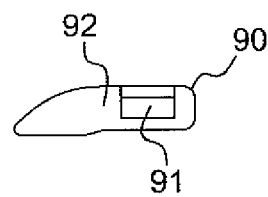
FIGS. 9 and 10 are schematic and partial views, in section respectively along IX-IX and X-X, of the connection member from FIGS. 7 and 8.

This electrical connection member 90 comprises a plurality of electrically conductive elements 91 which are partially embedded by over-moulding in an electrically insulating material 92, as illustrated in FIGS. 8 and 9 in particular.

The connection member 90 comprises a crown made of the electrically insulating material 92.

Each conductive element 91 is substantially U-shaped.

Figure 11:
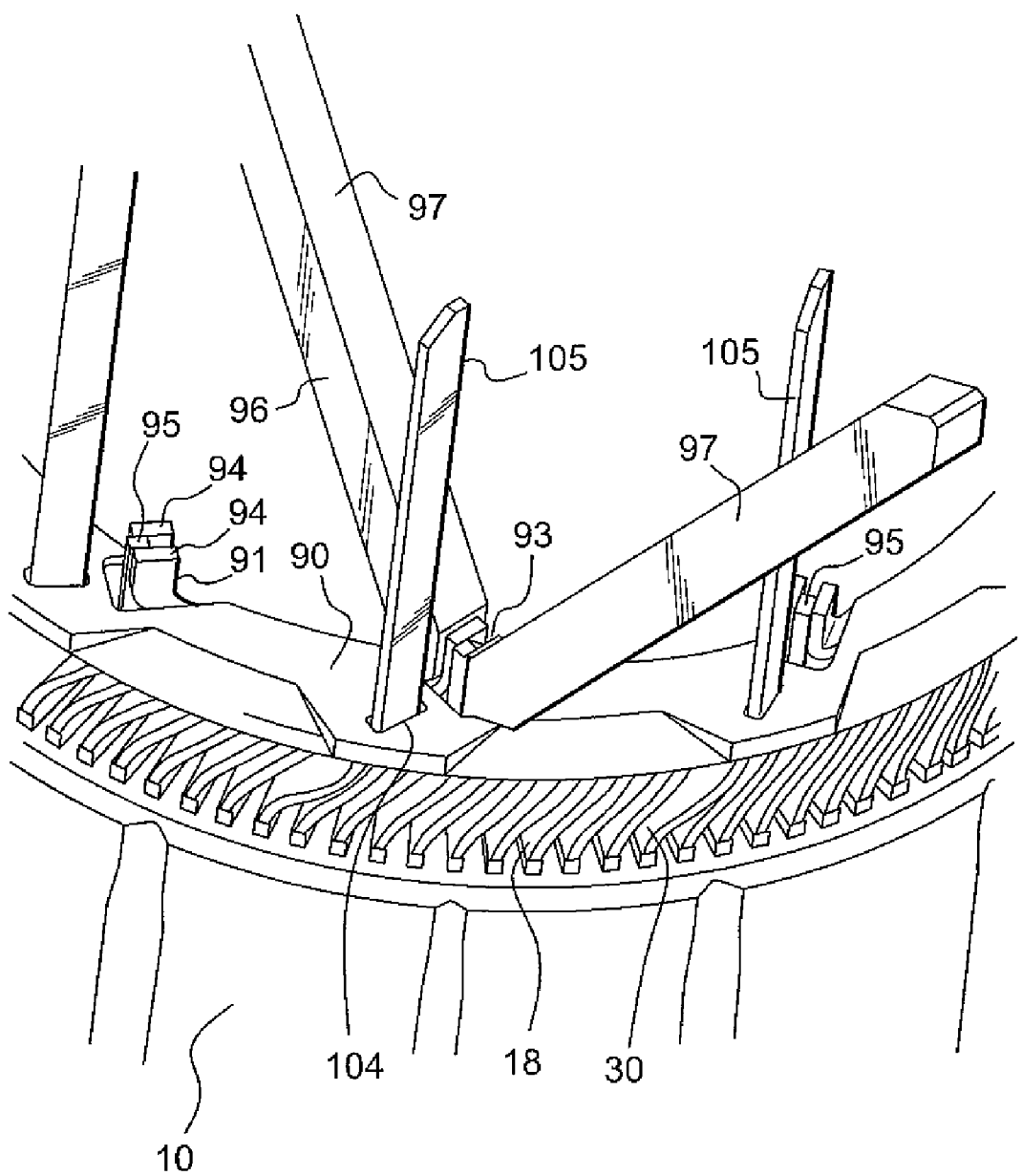
FIG. 11 illustrates schematically and partially the use of a tool for welding to the assembly from FIG. 6.

Each pair of two of these neighbouring conductive elements 91 forms, between end branches 94 of the U, a space 93 for inserting a conductor end 95 forming an electrical neutral point of the coil 18, as may be seen in particular in FIG. 11.

The conductor end 95 forming an electrical neutral point of the coil is welded, in particular by resistance or electric arc braze welding or by soft or laser brazing, to the adjacent conductive elements 91 of the electrical connection member 70.

As illustrated in FIG. 11, the welded joint is produced for example with the aid of a tool 96 provided with two electrodes 97.

Figure 10:
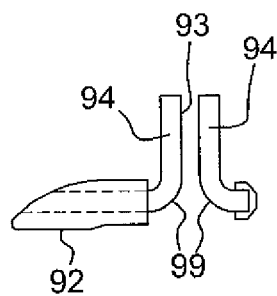

The conductive elements 91 of the electrical connection member 90 each comprise a chamfer 99 facing the coil 18 of the stator 16 which is configured to facilitate the insertion of a conductor end 95 forming an electrical neutral point of the coil 18 (see FIG. 10).

Figure 7:
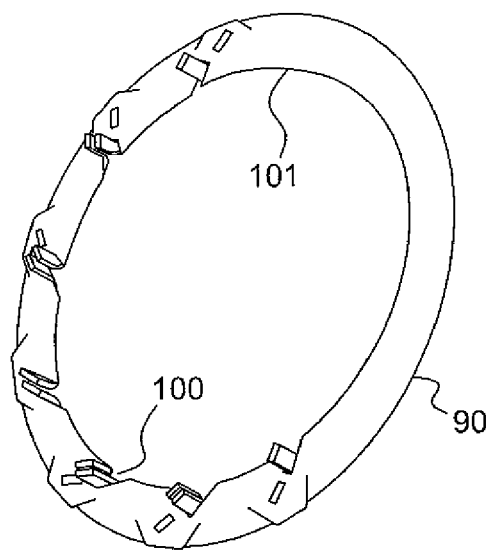
FIGS. 7 and 8 show, schematically and partially, in an isolated manner, in two different views, the connection member according to FIG. 6.

The electrical connection member 90 comprises a plurality of slots 100 opening onto an inner periphery 101 of this connection member 90 (see in particular FIGS. 7 and 8).

These slots 100 have for example a substantially rectangular shape.

Each slot 100 is configured to receive at least partially the conductor end 95 forming an electrical neutral point of the coil 18.

The inner periphery 101 is substantially circular, and each slot 100 forms with a diameter of the connection member 90 a non-zero angle A (see FIG. 8 for example).

The angle A is for example selected so as to be between 10° and 90°, being in particular about 45°.

This inclination A of the slot 100 is advantageous for passage of the welding tool 96.

Figure 12:
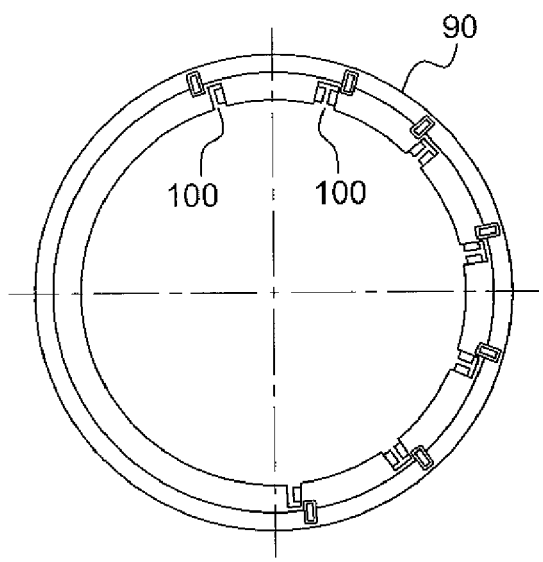
FIG. 12 shows schematically and partially an electrical connection member according to another exemplary embodiment of the invention.

In a variant, as illustrated in FIG. 12, each slot 100 may extend parallel to a diameter of the connection member 90.

The electrical connection member 90 comprises a plurality of rectangular-shaped orifices 104 which are formed in the electrically insulating crown 92 and configured to allow the passage of an electric conductor portion 105 of the coil 18 of the stator 16.

This conductor portion 105 forms a phase input or output of the stator coil.

This may be advantageous for rigidifying the foot of the conductor portion 105 passing through the orifice 104.

The conductive elements 91 of the connection member 90 are made of copper, for example.

As illustrated in FIG. 11, the electrical connection member 90 is placed on the tip of the lead-out 30 of the coil 18 of the stator 16.

Figure 6:
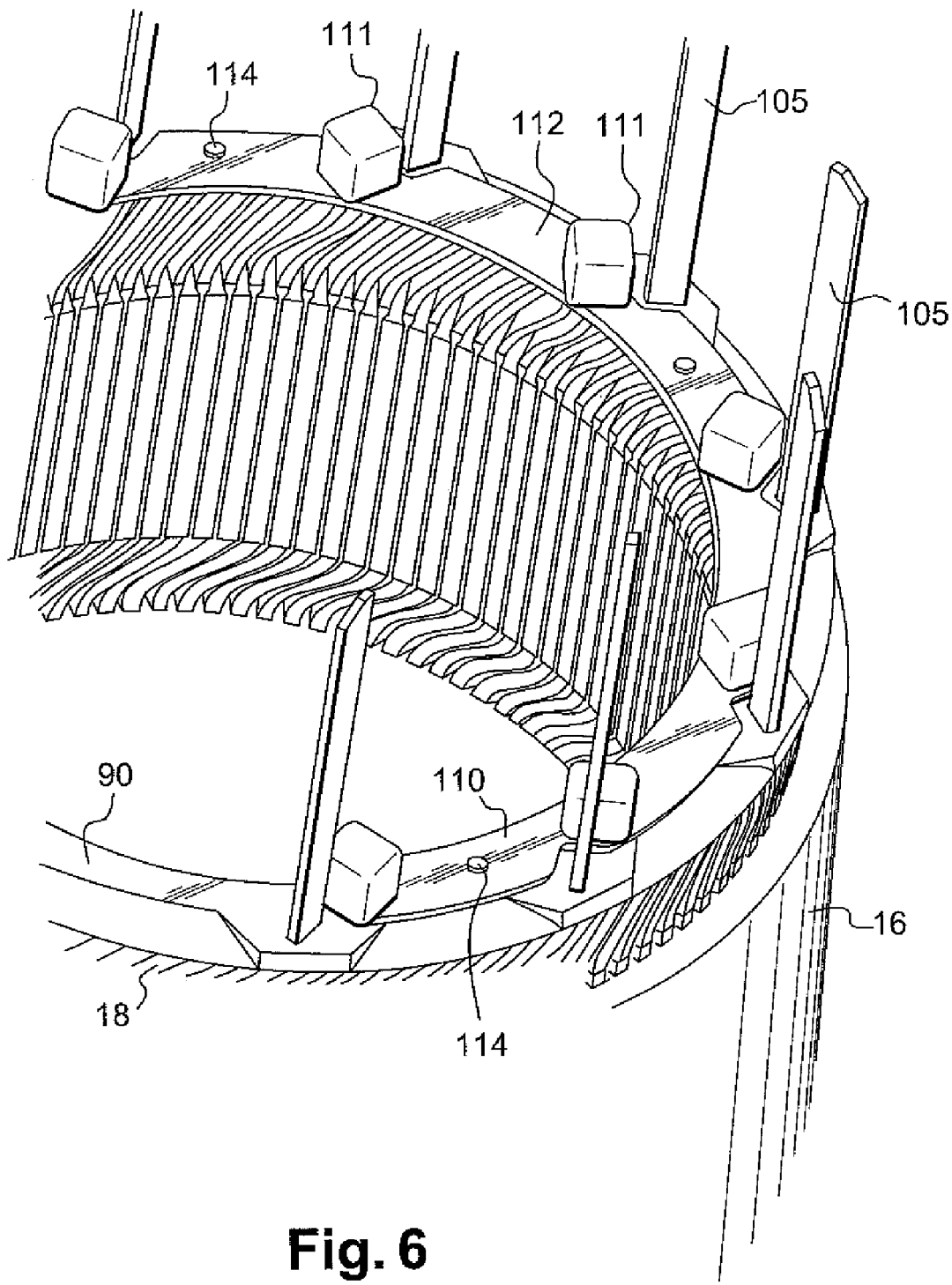
FIG. 6 shows, schematically and partially, an electrical connection member positioned on a stator coil according to an exemplary embodiment of the invention.

An electrical insulation member 110 is provided to cap the neutral point-forming conductor ends 95 which are inserted between the conductors 91, as illustrated in FIG. 6.

This insulation member 110 is disposed in an inner space defined between bearing mounts 46 and 48 of the machine 1.

The insulation member 110 comprises a plurality of caps 111 each formed by a bowl-shaped recess in an insulating strip 112 which is substantially in the shape of an arc of a circle.

This allows protection of the welded neutral points of the coil, as well as limitation of the axial air flows.

In the example described, the insulation member 110 is fixed to the connection member 90 with the aid of spikes 114.

Figure 13:
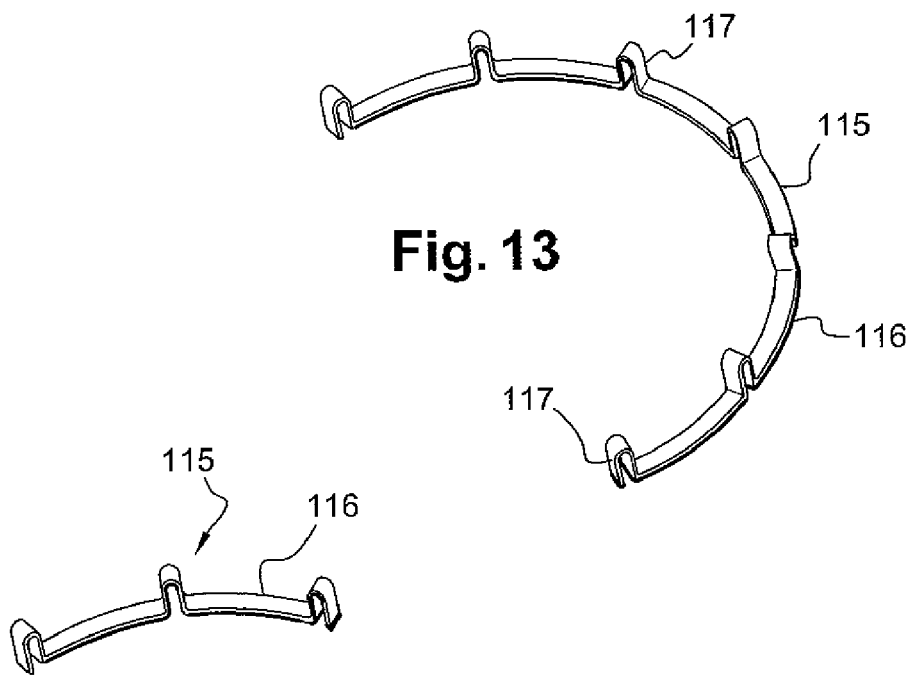
FIGS. 13 and 14 show, schematically and partially, two other exemplary embodiments of the invention for a connection member.
Figure 14:
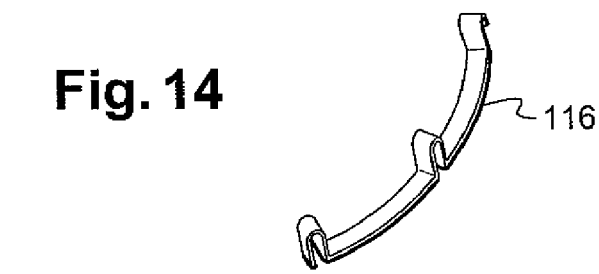

FIGS. 13 and 14 show two examples of connection members according to the invention.

In the example from FIG. 13, the electrical connection member 115 is configured to allow all the neutral points of the coil 18 of the stator to be electrically connected.

This electrical connection member 115 comprises a single non-circular electrically conductive strip 116, this conductive strip being bare, by lacking electrically insulating coating.

The conductive strip 116 comprises a plurality of U-shaped portions 117 each allowing contacting with an end 95 forming an electrical neutral point of the coil 18.

In a variant of the invention illustrated in FIG. 14, the connection member 115 comprises two separate non-circular conductive strips 116 each provided for just three connections.

The invention claimed is:

1. A rotating electrical machine (1) for a motor vehicle, said machine being one of an alternator and an alternator-starter, said machine comprising:
   at least one bearing mount (48) provided with at least one opening (49) opening onto the exterior of said bearing mount,
   a stator (16) comprising an electric coil (18), said coil comprising a plurality of electric conductors, at least one of said electric conductors comprising an end (95) forming an electrical neutral point of said coil, and
   an electrical insulation member (70) configured to prevent any contact between said bearing mount (48) and said neutral point-forming conductor end, said insulation member extending at least partially through said at least one opening of said bearing mount and being at least partially outside said bearing mount, said electrical insulation member being furthermore configured to rest at least partially on an outer surface (71) of said bearing mount, said insulation member (70) being configured to at least partially plug said at least one opening (49) with the aid of a radially protruding portion (79).

2. A rotating electrical machine for a motor vehicle, said machine being one of an alternator and an alternator-starter, said machine comprising:

at least one bearing mount (48) provided with at least one opening (49) opening onto the exterior of said bearing mount;

a stator (16) comprising an electric coil (18), said coil comprising a plurality of electric conductors, at least one of said electric conductors comprising an end (95) forming an electrical neutral point of said coil;

an electrical insulation member (70) configured to prevent any contact between said bearing mount (48) and said neutral point-forming conductor end, said insulation member extending at least partially through said at least one opening of said bearing mount and being at least partially outside said bearing mount, said electrical insulation member being furthermore configured to rest at least partially on an outer surface (71) of said bearing mount;

said insulation member (70) being configured to at least partially plug said at least one opening (49) with the aid of a radially protruding portion (79); and an electrical connection member (90) being configured to allow two neutral points of said coil of said stator to be electrically connected, said electrical connection member comprising at least one electrically conductive element (91) partially embedded in an electrically insulating material (92), said electrical connection member at least partially plugs said at least one opening (49) of said bearing mount.

3. A rotating electrical machine for a motor vehicle, said machine being one of an alternator and an alternator-starter, said machine comprising:

at least one bearing mount (48) provided with at least one opening (49) opening onto the exterior of said bearing mount;

a stator (16) comprising an electric coil (18), said coil comprising a plurality of electric conductors, at least one of said electric conductors comprising an end (95) forming an electrical neutral point of said coil; and an electrical insulation member (70) configured to prevent any contact between said bearing mount (48) and said neutral point-forming conductor end, said insulation member extending at least partially through said at least one opening of said bearing mount and being at least partially outside said bearing mount, said electrical insulation member being furthermore configured to rest at least partially on an outer surface (71) of said bearing mount;

said insulation member (70) being configured to at least partially plug said at least one opening (49) with the aid of a radially protruding portion (79);

said insulation member comprising at least one tongue (72) extending at least partially through said at least one opening (49) of said bearing mount and configured to prevent any contact between said bearing mount and said neutral point-forming conductor end.

4. The machine according to claim 3, wherein said at least one insulation member comprises as many insulation tongues (72) as there are neutral points of said coil.

5. The machine according to claim 3, wherein said at least one insulation tongue (72) comprises a substantially semicylindrical base (74) connected to a planar face of said insulation member, in an inclined manner relative to this planar face (75) so as to form an advantageously non-zero angle.

6. The machine according to claim 1, wherein said insulation member comprises at least one notch (76) configured to receive a phase output-forming conductor end, said notch being open on an outer periphery (77) of said insulation member.

7. The machine according to claim 1, wherein said insulation member comprises at least one engagement tab (80) configured to allow said insulation member to be fixed to said bearing mount.

8. The machine according to claim 1, further comprising at least one electronic unit equipped with a heat dissipator provided with fins (82), and said insulation member comprises at least one groove allowing a fin of said heat dissipator to be engaged at least partially therein.

9. The machine according to claim 2, wherein said electrical connection member comprises a plurality of conductive elements (91) each being substantially U-shaped, at least two of said conductive elements forming a space (93) for inserting said conductor end forming said electrical neutral point of said coil.

10. The machine according to claim 9, wherein said conductor end (95) forming said electrical neutral point of said coil is welded, by resistance or electric arc braze welding or by soft or laser brazing, to the adjacent conductive elements of said electrical connection member.

11. The machine according to claim 2, wherein said electrical connection member (90) comprises at least one slot (100) opening onto an inner periphery (101) of said connection member, said slot being configured to receive at least partially said conductor end forming said electrical neutral point of said coil.

12. The machine according to claim 11, wherein said connection member has a substantially circular inner periphery, and wherein said slot (100) forms with a diameter of said connection member a non-zero angle (A).

13. The machine according to claim 2, wherein said electrical connection member comprises at least one orifice (104) formed in an electrically insulating crown and configured to allow the passage of an electric conductor portion of said stator coil, said conductor portion forms a phase input or output of said stator coil.

* * * * *